Dec. 30 3,486,432

CO-ORDINATE VIEWFINDER FOR CAMERA

Filed Aug. 7, 1967

INVENTOR.
DONALD W. NORWOOD
BY

United States Patent Office 3,486,432
Patented Dec. 30, 1969

3,486,432
CO-ORDINATE VIEWFINDER FOR CAMERA
Donald W. Norwood, 1470 San Pasqual,
Pasadena, Calif. 91106
Filed Aug. 7, 1967, Ser. No. 658,902
Int. Cl. G03b 19/12, 13/16
U.S. Cl. 95—44        4 Claims

ABSTRACT OF THE DISCLOSURE

The lens focal length and the camera to subject distance are displayed in the viewfinder of a camera having an electrically operated zoom lens. This is accomplished by means of a series of prisms arranged such that the zoom setting and the focus distances are viewed directly from the indicator rings on the camera lens. The appropriate lens settings are made through two control levers which serve to adjust the lens such that the settings are visible on a horizontal scale in the bottom of the viewfinder and on a vertical scale on the right hand side of the viewfinder. Each of the scales visible in the viewfinder has an associated index which moves along the scale such that the apparent motion of the index relative to the scale is in the same direction as the movement of the particular control lever being used.

---

This invention relates to improvements in photographic cameras, and more particularly to the presentation of more information in the viewfinder portion of the camera. It facilitates the focusing of a camera lens. It also facilitates the adjustment of the focal length of that type of camera lens which embodies a variable focal length.

The invention is particularly useful in the case of motion picture or television cameras which frequently encounter situations where the camera-to-subject distance changes while photography is in progress and the focus of the lens must be changed to meet the conditions. Similarly it is useful on such cameras where change of focal length of the lens is desirable, while photography is in progress, in order to meet the situation.

Some conventional cameras have a viewfinder in which appears an image of a photographic scene identical to that image which is or will be projected onto the camera film. In normal procedure, the lens focus is adjusted until the significant portion of the image in the viewfinder appears sharply defined. However, such adjustment is frequently retarded due to lack of information as to which direction to start to move the lens adjustment to improve the sharpness of the image. Consequently, the lens adjustment must normally be moved hit-or-miss in first one direction and then the other until the photographer becomes aware by trial of the correct direction of adjustment. Thus, such adjustment may take an excessive amount of time and, in the case of motion picture photography, may require re-photographing of a scene.

In the case of a variable focal-length lens, the relative size of the image in the viewfinder may serve as a rough guide as to the focal length to which the lens has been adjusted, or the photographer may stop everything else while he goes around to the front of the camera to read the said value on a focal length indicating scale and co-operating index on the lens. However, the situation would be greatly improved if the photographer had continuous information during photography of the exact value of the effective focal length, and particularly the range of adjustment remaining available in either direction.

My invention provides significantly better information for a cameraman in each of the above described cases, as well as providing other benefits.

A full understanding of the invention, and of its further objects and advantages, will be had from the following description of certain illustrative manners of carrying it out. That description, and the accompanying drawings which form a part of it, are intended only as illustration, and not as a limitation upon the scope of the invention, which is defined in the appended claims.

Figure 1:
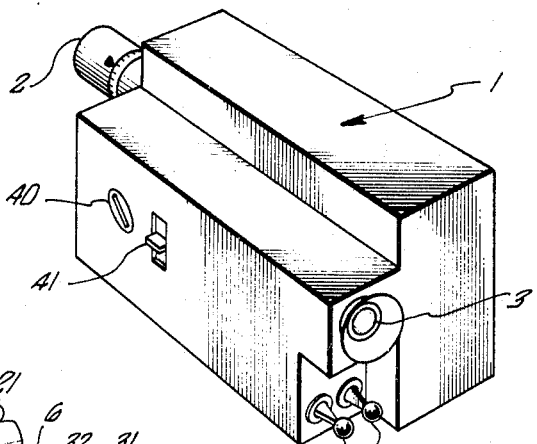
FIG. 1 is a perspective view representing an illustrative motion picture camera, viewfinder and a variable focal length lens, the camera embodying a preferred form of the present invention.

The illustrative motion picture camera 1, shown in FIG. 1, has conventional elements for film supply, film take-up, film advance mechanism, shutter mechanism, power supply, etc. (none shown). It is shown with an objective lens 2 of the well-known variable-focal-length type. It has a viewfinder eyepiece lens 3, through which may be seen an image 4', FIG. 3, of the photographic scene at which the camera is aimed.

Figure 2:
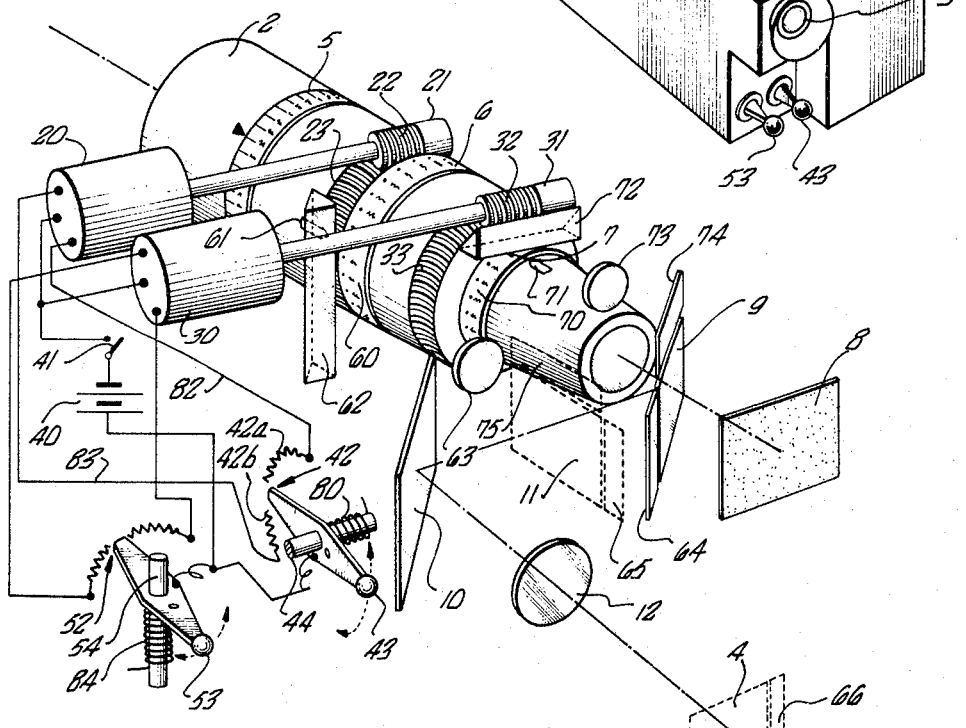
FIG. 2 is a fragmentary exploded perspective of some of the interior parts of the camera, including optical system and viewfinder elements, with an electric control being shown in diagrammatic form.

The lens 2, also shown in FIG. 2, has conventional adjustments including ring 5 for adjusting the lens aperture size, adjustment including ring 6 for adjusting the lens focal-length, and adjustment including ring 7 for adjusting the focus for camera-to-subject distance. The lens 2 acts in a conventional manner to form an image of the photographic scene and to project that image onto an image area which constitutes one motion picture film frame 8.

There is a semi-transparent beam-splitter 9, of well-known type, located in the path of the projected image and arranged at 45° to the optical axis of lens 2. It acts to transmit a major percentage of the image beam intensity toward the film 8, and reflect a minor percentage toward a first-surface mirror 10, also located at 45° to the optical axis of lens 2. Optically speaking, an aerial image of the scene is formed at 11. This image is similar to the image projected onto the film 8, and is located at an axial distance from 9, equal to the axial distance from 9 to 8. The mirror 10 reflects image 11 toward an erector lens 12. Lens 12 acts to form an erect aerial image 4. The erect image is magnified by and transmitted through the eyepiece lens 3 to the photographer's view, where it is seen as 4' in FIG. 3.

The lens adjustment for focal length is operated by a small electric motor 20, whose shaft carries a slip-clutch 21 attached to a worm gear 22. Worm gear 22 meshes with a ring gear 23 which is attached to the conventional focal length adjustment ring 6. The electric motor 20 is of D.C. type, and will turn in either direction depending on which two of its three illustrated motor terminals receive the power supply and has variable speed depending on applied voltage. The slip-clutch 21 transmits turning motion to the worm gear 22 when the ring 6 is between limits. When a limit stop is reached, the clutch appropriately slips to prevent breakage.

The lens adjustment for focus-for-distance is operated by an arrangement similar to that above and including motor 30, slip-clutch 31, worm gear 32 and ring gear 33 attached to the adjustment ring 7.

There is a battery 40, which supplies power for the motors. An on-off switch 41 connects one end of the battery to a center terminal of each of the motors 20 and 30.

There is an electrical circuit which includes motor 20, electrical lines 82, 83, and a switch and variable resistor unit 42, of well-known type.

The unit 42 comprises two resistor elements 42a and 42b disconnected at their adjacent ends and connected at opposite ends to respective terminals on the motor 20 through lines 82 and 83.

A manual control lever 43, integral with the contact blade of the unit 42, can be moved in a vertical plane, up or down, about a pivot shaft 44. The lever 43 is returned to its illustrated central position by a torsion spring 80 when any applied off-set pressure is released. In such central position the blade of unit 42 is disconnected from both resistor elements. The over-all function of this arrangement is to provide adjustment of the lens focal length in one direction when the control lever 43 is moved upward and adjustment in the other direction when the control is moved downward. The speed of adjustment in either direction is dependent on the degree of offset of the control lever from its central position.

There is a similar electrical circuit which includes motor 30, battery 40, switch 41, and a switch and variable resistor unit 52 for effecting adjustment of the ring 7. A manual control level 53 integral with the contact blade of unit 52 can be moved in a horizontal plane, right or left, about a vertical pivot shaft 54. The overall function of this arrangement is to provide adjustment of the lens focus-for-distance in one direction when the control is moved to the right and adjustment in the other direction when the control is moved to the left. The speed of adjustment is similarly dependent on the degree of offset of the control lever. A torsion spring 84 returns the lever 53 to its illustrated central position when released. In such position, the blade of unit 52 is disconnected from both resistor elements of unit 52.

The lens focal-length adjustment ring 6 carries a focal-length scale 60. There is a cooperating index 61 attached to the body of the lens 2. The relative positions of 60 and 61 indicate the effective focal-length of the lens. There is a glass prism 62 of the 90° type which reflects an image of scale 60 and index 61 toward a lens 63. Lens 63 projects the image beam to front-surface mirror 64, which reflects the beam to form an aerial image 6, adjacent aerial image 11 of the photographic scene.

Figure 3:
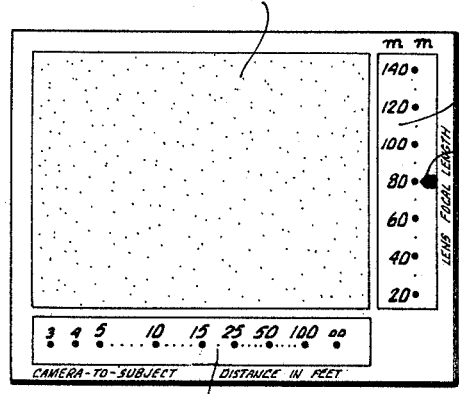
FIG. 3 illustrates the information panel which is presented in the viewfinder.

In a manner similar to the reflection and transmission of scene image 11 by mirror 10 and lens 12, the aerial image 65 is projected to form aerial image 66, which is viewed through lens 3 as a magnified image 66', as shown in FIG. 3.

The lens focus-for-distance adjustment 7 carries a camera-to-subject distance scale 70. There is a cooperative index 71 attached to the body of the lens 2. The relative positions of 70 and 71 indicate the camera-to-subject distance for which the focal adjustment of the lens has been made.

There is a glass prism 2 which reflects an image of the scale 70 and index 71 toward a lens 73. Lens 73 projects the image beam to a front-surface mirror 74 which reflects the beam to form an aerial image 75 adjacent aerial image 11 of the photographic scene.

In a manner similar to that described above for aerial image 65, the aerial image 75 is projected to form aerial image 76, which is viewed through lens 3 as magnified image 76'.

The above-described arrangement provides that the actual numerical value of any adjustment of the lens focal length will be shown by the image 66' in the viewfinder. Any change in adjustment will be shown by relative vertical motion between the images of the index and scale. As heretofore described, vertical displacement of the control lever 43 will result in such change in adjustment. The design of the apparatus is so arranged that upward movement of the control 43 will result in apparent upward movement of the index relative to the scale, and downward movement of the lever will result in apparent downward movement of the index relative to the scale. Thus the apparent relative movement of the index follows the movement of the control lever. This makes operation of the device very practical and easy.

Similar relationships apply in the case of the focal adjustment-for-distance control, except that the movements are horizontal in this case, instead of vertical.

This co-ordinate viewfinder provides, in a convenient and practical form, by means of lens scale image adjacent to scene image, double information for the photographer regarding each of the various focal adjustments of the camera lens. First, he can see the visual effect of the adjustment as shown by the scene image 4'. In the case of focal adjustment distance he can note the sharpness of that portion of the image where maximum sharpness is desired. Next he can note the co-ordinate numerical value of the focal adjustment 76' for distance. Should a moving subject go to a greater distance, the cameraman knows instantly the direction in which to adjust the lens to maintain sharpness. Should it be desired to shift focus from a further subject, the numerical values are right there to assist in the shift.

In the case of lens effective focal-length, the relative size of a subject in the visual image 4' and also the boundaries of the scene may be viewed. Also the adjacent image 66' which shows the coordinate numerical value of the lens focal-length may be noted. Any given value can be duplicated at a future date to create a similar shot. In the case of a zoom shot, the image of the scale and index not only indicates the effective focal-length at any given time but also shows how much adjustment range is still available at each end of the scale. These are benefits which are of exceptional value to a cameraman and are continually available while he is looking into the viewfinder at the scene being photographed. They will enable the production of better photography, and in substantially less time, both very desirable features.

Various changes in the details of the illustrative arrangement shown and described, some of which are mentioned below, are possible without departing from the spirit of the invention.

Although electrical controls and adjustment means are shown in the illustrative camera, it is possible to substitute mechanical means therefor.

Although two different types of focal adjustments are shown, it is possible to use the invention as applied to either one alone.

Although a lens having a variable focal-length as well as focal adjustment for camera-to-subject distance is shown, it is possible to use the invention with a lens having only focal adjustment for camera-to-subject distance, or only lens focal-length adjustment.

Various other optical or mechanical or electrical means may be used for presenting images of the scales and indices, or actual extensions of those scales and indices, which represent focal adjustments of the lens, in the viewfinder adjacent to the image of the photographic scene.

The viewfinder may have a separate image-forming objective. Also, the viewfinder image may be formed by electrical means, as in a television camera.

The scales and indices shown in the illustrative camera are so arranged that the indices are fixed to the body of the lens, while the scales move with the adjustment rings. A reverse arrangement in which the scales are fixed to the body of the lens and the indices move with the adjustment rings is also feasible.

At least one focal adjustment of the lens, and corresponding scale, may extend in a longitudinal direction, parallel to the lens axis, instead of being circumferential as illustrated.

In the appended claims, the term "focal value" is intended to define such characteristics as the focal length to which the lens is adjusted or the camera-to-subject distance for which the lens is adjusted.

I claim:
1. In a camera including lens means adjustable to different focal values for directing a scene image onto a photoreceptive surface, and
   a viewfinder which presents visual pictorial information of the appearance of said scene image;
   means for providing additional information in said viewfinder pertaining to the lens focal adjustment which determines certain characteristics of the composition of said scene image,
   said additional information being coordinate with said first mentioned visual information and being located adjacent said first mentioned information,
   said last mentioned means comprising lens scale means which indicate the focal adjustment of said lens means,
   an index cooperable with said lens scale means to indicate the focal value to which said lens means has been adjusted, and
   manual control means for adjusting said lens means to different focal values,
   said lens scale means and said index being arranged so that the apparent motion of said index relative to said scale means, as seen in said viewfinder, is in the same direction as the movement of said manual control means.

2. In a camera according to claim 1 wherein said index is stationary relative to said viewfinder and said scale means is movable relative to said index.

3. In a camera according to claim 2 wherein said scale means is movable along one side of the visual presentation of said pictorial information in said viewfinder and said index is located midway between opposite ends of said visual presentation.

4. In a camera including lens means adjustable to different focal lengths for directing a scene image onto a photoreceptive surface, and
   a viewfinder which presents visual pictorial information of the appearance of said scene image;
   means for providing additional information in said viewfinder pertaining to the lens focal length adjustment which determines certain characteristics of the composition of said scene image,
   said additional information being coordinate with said first mentioned visual information and being located adjacent said first mentioned information,
   said last mentioned means comprising lens scale means which indicate the focal length of said lens means,
   an index cooperable with said lens scale means to indicate the focal length to which said lens means has been adjusted, and
   means for adusting said lens means to different focal lengths whereby to change the composition of said scene image.

References Cited

UNITED STATES PATENTS 2,940,373   6/1960   Berg et al. _____ 95—45

FOREIGN PATENTS 1,051,433   12/1966   Great Britain.

NORTON ANSHER, Primary Examiner

R. L. MOSES, Assistant Examiner

U.S. Cl. X.R.

95—42; 350—187; 352—171